United States Patent [19]

Tada

[11] Patent Number: 5,138,702
[45] Date of Patent: Aug. 11, 1992

[54] EXTERNAL IMAGE INPUT/OUTPUT DEVICE CONNECTABLE IMAGE PROCESSING SYSTEM

[75] Inventor: Kaoru Tada, Azuchi, Japan

[73] Assignee: Minolta Camera Co., Ltd., Osaka, Japan

[21] Appl. No.: 526,766

[22] Filed: May 21, 1990

Related U.S. Application Data

[63] Continuation of Ser. No. 181,817, Apr. 15, 1988, abandoned.

[30] Foreign Application Priority Data

Apr. 17, 1987 [JP] Japan ................................. 62-95748
Apr. 17, 1987 [JP] Japan ................................. 62-95749
Apr. 28, 1987 [JP] Japan ................................. 62-106547

[51] Int. Cl.[5] .................................................. G06F 15/00
[52] U.S. Cl. .................................... 395/275; 395/162
[58] Field of Search ... 364/518, 519, 550, 200 MS File; 358/408, 438; 395/162, 275

[56] References Cited

U.S. PATENT DOCUMENTS

| | | | |
|---|---|---|---|
| 4,471,348 | 9/1984 | London et al. | 364/550 X |
| 4,486,870 | 12/1984 | Pettigrew et al. | 364/518 X |
| 4,581,656 | 4/1986 | Wada | 358/257 |
| 4,636,939 | 1/1987 | Fildes | 364/200 |
| 4,658,299 | 4/1987 | Tanaka et al. | 358/401 |
| 4,695,895 | 9/1987 | Nagashima | 358/426 |
| 4,734,786 | 3/1988 | Minakawa et al. | 358/451 |
| 4,769,852 | 9/1988 | Hashimoto et al. | 382/45 |
| 4,791,492 | 12/1988 | Nagashima et al. | 358/409 |
| 4,797,706 | 1/1989 | Sugishima et al. | 358/300 |

OTHER PUBLICATIONS

Stone, 1982, Microcomputing Interfacing, pp. 215-227, Addison-Wesley Publishing.

Primary Examiner—Gary V. Harkcom
Assistant Examiner—Mark K. Zimmerman
Attorney, Agent, or Firm—Price, Gess & Ubell

[57] ABSTRACT

A plurality of image input devices and a plurality of image output devices are connected to a system bus and an image bus of an image processing system through an external device control unit. The image processing system comprises a host CPU, an image processing unit, a CRT and multiple input and output devices, which are connected with each other through the system bus and the image bus. The external device control unit comprises a control CPU for controlling various processing based on various commands, a switch connected to each of the image input/output devices and to the image bus for switching combinations of connections of the image imput/output devices based on an instruction from the control CPU, a dual port for exchanging information between the host CPU and the control CPU through the system bus. An image input device can be connected directly to a desired image output device and the connected image input/output devices can be activated by an input from the operating unit of the image input device, without being subjected to the instruction from the host CPU.

18 Claims, 6 Drawing Sheets

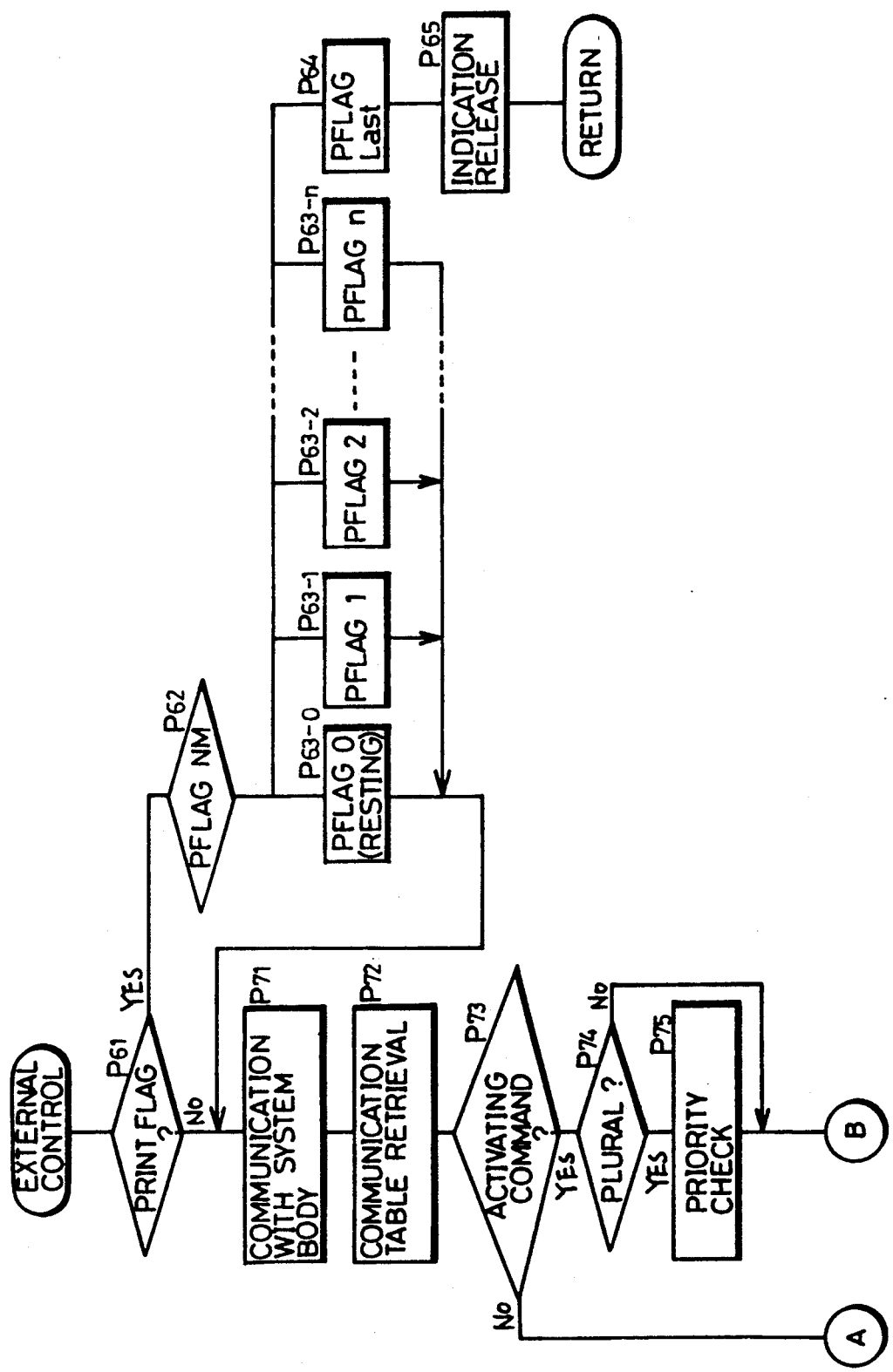

EXTERNAL IMAGE INPUT/OUTPUT DEVICE CONNECTABLE IMAGE PROCESSING SYSTEM

This is a continuation of application Ser. No. 181,817, filed on Apr. 15, 1988, for a EXTERNAL IMAGE INPUT/OUTPUT DEVICE CONNECTABLE IMAGE PROCESSING SYSTEM, now abandoned.

BACKGROUND OF THE INVENTION

1. Field of the Invention

The present invention relates to an image processing system to which external image input/output devices are to be connected and, more specifically, it relates to input/output control of image data between the system and the external input/output device or between each of the external input/output devices.

2. Description of the Prior Art

Some Image processing systems are connected to a plurality of external image input/output devices. The external devices comprise, for example, an image reader for reading original images, a microscanner for reading images for microfilms, a laser printer for printing out the images, and a laser filmer for forming a microfilm by means of the laser.

Conventionally, when the control of the image bus is carried out from the side of the image processing unit, the bus which is currently used can be known only from the side of the image processing unit. Therefore, if an image reader and a laser printer should be combined so as to be used as a digital copier, the operator can not determine whether this combination is available or not.

An image processing system such as disclosed in U.S. Pat. No. 4,658,299 comprises an image input unit, an image output unit, an image processing unit and an operation unit for instructing the image processing, wherein the image input unit can be activated both from the image input unit and the operation unit. However, when each of the external devices are to be connected in such image processing system to other external image input/output devices, the image bus which is employed for the communication of the image data can be controlled only by the control means controlling the image processing unit. Therefore, the instructions for connecting the input/output devices are applied from the operation unit which instructs the image processing, and the control means controlling the image processing unit controls the image bus which connects the input/output devices according to the instructions from the operation unit, thereby connecting the instructed devices.

However, in this system, the control means in the image processing unit has to monitor external image input/output devices at all times, which is a heavy burden in processing.

Meanwhile, sometimes, the selection of a certain image input device automatically determines an image output device which should be combined with the input device. For example, an image reader and a laser printer should be combined so as to be used as a digital copier, and a microscanner and a laser filmer should be combined so as to be used as a digital filmer. In these cases, it is convenient for an operator to designate from the side of the external image input device the external output device to be combined thereto.

SUMMARY OF THE INVENTION

An object of the present invention is to provide an image processing system in which the image system can be operated from the side of an external image input device.

More specifically, an object of the present invention is to provide an image processing system in which each of the external image input/output devices can be connected from the side of the external image input device.

More specifically, an object of the present invention is to provide an image processing system in which prescribed image input/output devices can be easily connected to each other by designating the external image output device which is to be connected from the side of the external image input device.

More specifically, an object of the present invention is to provide an image processing system in which external image input/output devices can be connected to each other and the connected image input/output devices can be activated from the side of the external image input device.

In order to attain the above described objects, the present invention broadly comprises an image processing system comprising: an internal image processing section having an image processing unit and a display unit connected with each other through a system bus communicating a control command and through a data bus communicating image data, and a control unit for controlling the image processing unit and the display unit through the system bus based on the control command and for generating a first command, for processing image data communicated through the data bus; a plurality of external input devices which should be connected to the internal image processing section and having an input portion for inputting a second command; a plurality of external output devices which should be connected to the internal image processing section; and external device connecting means for connecting the data bus, the external input device and the external output device with each other according to a prescribed combination based on the first command from the control unit and on the second command from the external input device.

In order to attain the above described objects, the present invention comprises, in an aspect, an image processing system comprising: an internal image processing section having an image processing unit and a display unit connected with each other through a system bus communicating a control command and through a data bus communicating image data, and a control unit for controlling the image processing unit and the display unit through the system bus based on the control command and for generating a first command, for processing image data communicated through the data bus; a plurality of external input devices which should be connected to the internal image processing section and having an input portion for inputting a second command; a plurality of external output devices which should be connected to the internal image processing section; and external device connecting means provided between the data bus, the external input device and the external output device, comprising bus connecting means for connecting an arbitrary pair of the data bus, the external input device and the external output device with each other, and control means having memory means for storing the combination of the external input device and the external output device for designating the combination stored in the memory means based on the first or second command.

In order to attain the above described objects, the present invention comprises, in another aspect, an image processing system comprising: an internal image processing section having an image processing unit and a display unit connected with each other through a system bus communicating a control command and through a data bus communicating image data, and a control unit for controlling the image processing unit and the display unit through the system bus based on the control command for generating a first command, for processing image data communicated through the data bus; a plurality of external input devices which should be connected to the internal image processing section and having an input portion for inputting a second command; a plurality of external output devices which should be connected to the internal image processing section; and external device connecting means provided between the data bus, the external input device and the external output device, having bus connecting means for connecting an arbitrary pair of the data bus, the external input device and external output device with each other, and control means for designating the combination to be connected by the bus connecting means based on the first or second command so as to activate devices in association with the designated combination.

The image processing system structured as described above is capable of connecting image input/output devices with each other from the side of the external input device. In an aspect, the combination of the devices can be easily designated from the external input device and, in another aspect, the connected devices can be activated from the external input device.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram centered on the internals of the external device control unit in accordance with one embodiment of the present invention, showing the internal structure and the connection of the peripheral devices, and so on;

FIGS. 7A and 7B show a flow of external control which is a subroutine of the main flow of the CPU in accordance with one embodiment of the present invention.

DESCRIPTION OF THE PREFERRED EMBODIMENTS

Figure 1:
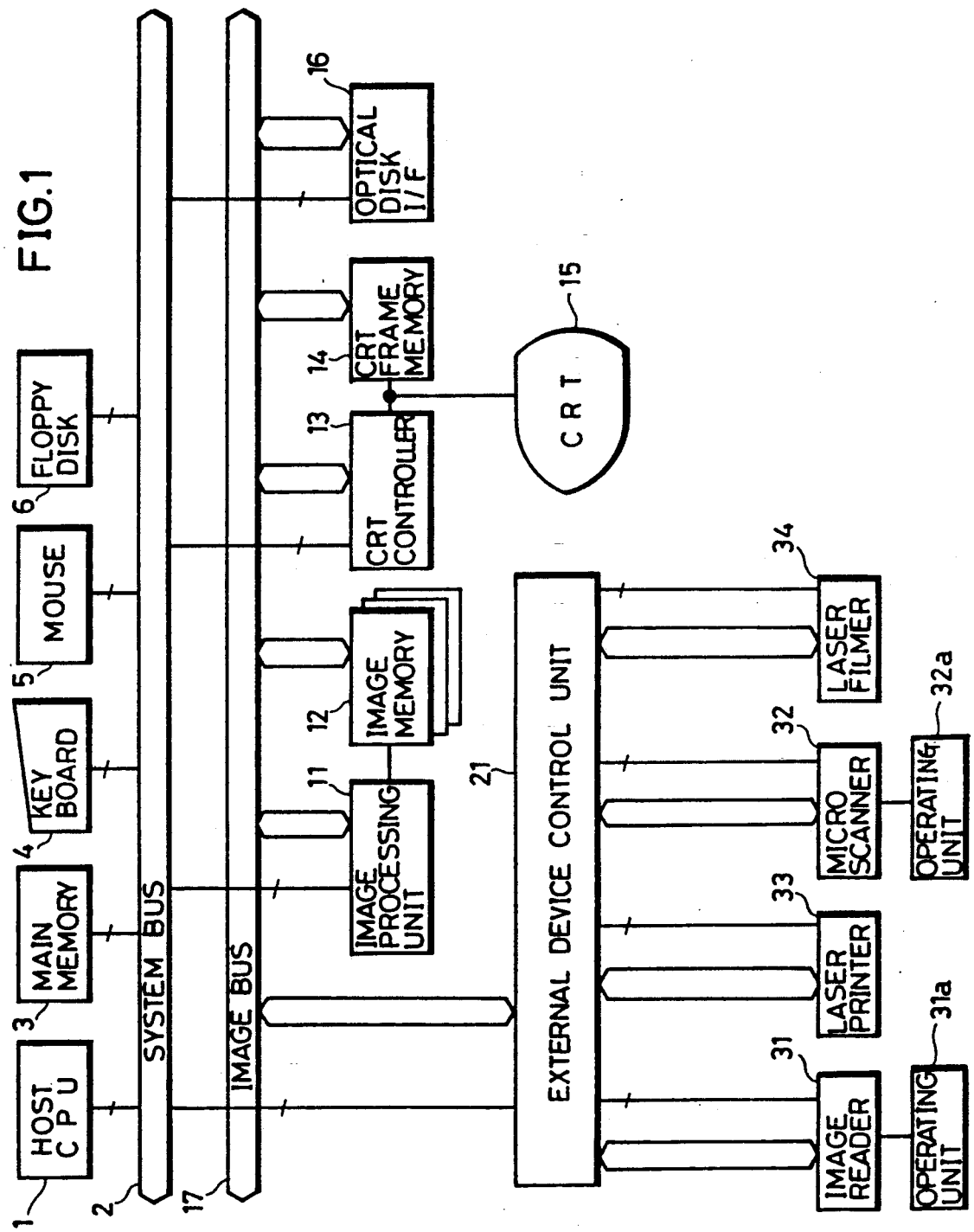
FIG. 1 is a block diagram showing an image processing system in accordance with one embodiment of the present invention, showing connections between each of the devices.

FIG. 1 is a block diagram showing an image processing system in accordance with one embodiment of the present invention.

The structure of the system will be described in the following with reference to the figures. A host CPU 1 controlling the present system is connected to a main memory 3 for storing programs and the like, a keyboard 4 and a mouse 5 for inputting instructions and data, a floppy disk device (or a hard disk device) which is an auxiliary memory device, an image processing unit 11, a CRT controller 13, an optical disk interface 16 and to an external device control unit 21 through a system bus 2. The host CPU 1 carries out total management of the system, management of documents, management of optical disk, image processing, man-machine interface processing, and so on using the programs in the main memory 3. The CRT controller 13 displays on the CRT 15 icon of menu selections, inputted image, and so on stored in a CRT frame memory 14 based on the instruction from the host CPU 1. An operator proceeds with the operation by using the icon displayed on the CRT 15 and the key input of the keyboard 4 or selection buttons of the mouse 5. The image processing unit 11 carries out setting of image recording region and image editing expansion/reduction.movement. rotation.inversion and so on) based on the instruction from the host CPU 1 and stores the resulting image data in an image memory 12. The optical disk interface 16 is an interface employed for controlling the optical disk, and for compressing, restoring, and recording image data. The host CPU 1 is further connected to external devices 31 to 34 which are various external input/output devices, through an external device control unit 21 which will be described later.

The image processing unit 11, image memory 12, CRT controller 13, CRT frame memory 14, optical disk interface 16 and external device control unit 21 are respectively connected to an image bus 17 for image data communication and are capable of inputting/outputting image data with each other. The external devices 31 to 34 are connected to the image bus 17 not directly but through the external device control unit 21.

The external device control unit 21 is connected to the system bus 2 and to the image bus 17 on the side of the system body. Meanwhile, an image reader (DS) 31 and a microscanner (MS) 32 which are external image input devices having operation units 31a and 32a, respectively, and a laser printer (LP) 33 and a laser filmer (LF) 34 which are external image output devices are respectively connected to the external device control unit 21. As will be described later, the connection control of the image bus 17 through the external device control unit 21 and the control of the image output device through the system bus 2 can be carried out from these external image input devices. Therefore, the operation units 31a and 32a of the input devices 31 and 32 comprise a group of keys for designating an output device which is to be connected. These keys are used for selecting the output device which should be connected as well as for activating the combination of the selected output device and the input device.

Figure 2:
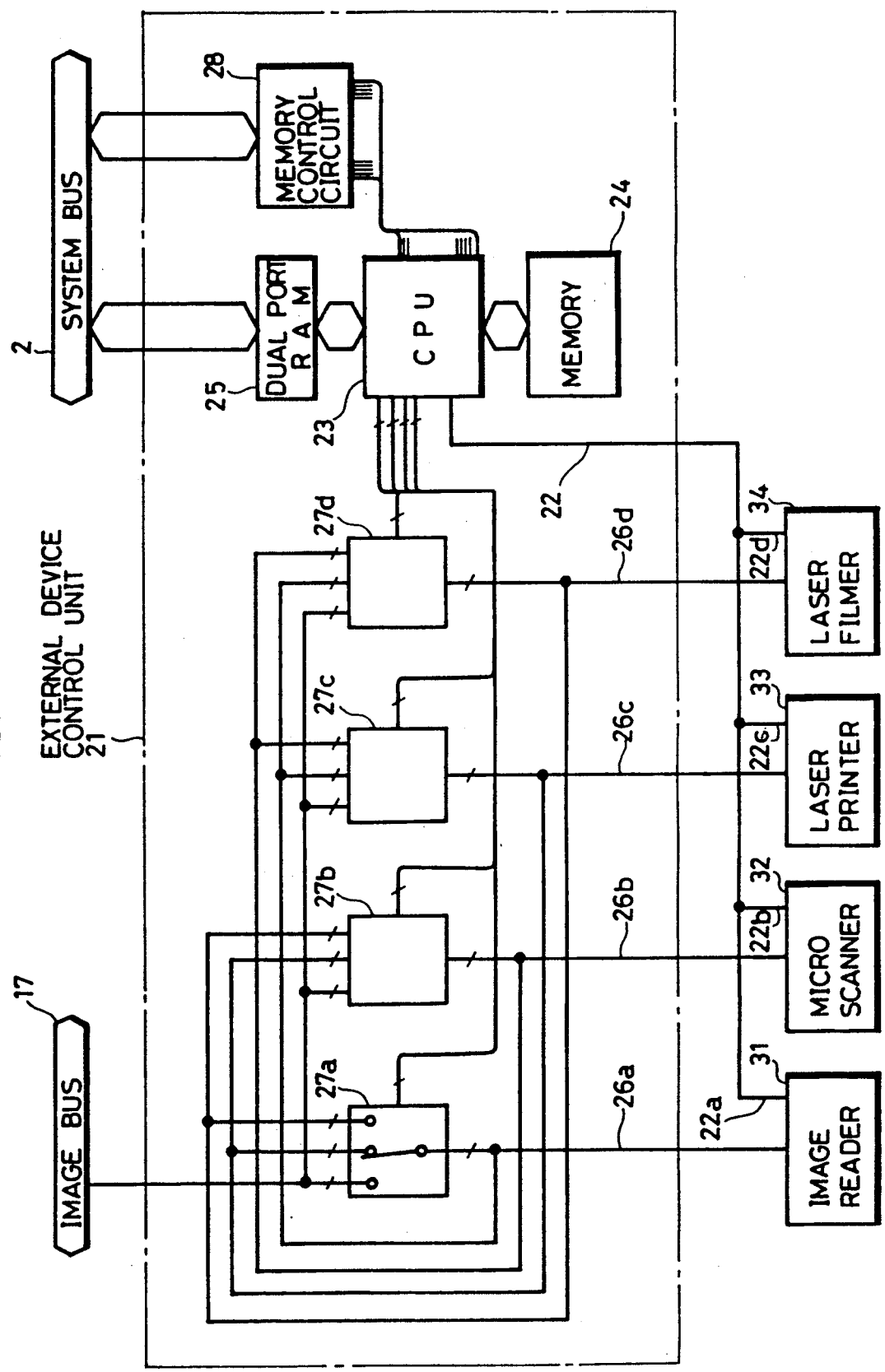

FIG. 2 is a block diagram of the external device control unit 21 in accordance with one embodiment of the present invention.

The structure of the unit will be described in the following with reference to the figure. Each of the external image input/output devices 31 to 34 is connected to a CPU 23 through each of the control command lines 22a, 22b, 22c and 22d and through a control command line 22 which is commonly connected thereto, for transmitting/receiving the control command. More specifically, the exchange of activating command such as scanning by the image reader 31 and printing by the laser printer 33, of a mode setting command such as expansion/reduction of the image reader 31, and of the information such as the device status and keyboard input on/off is effected through the control command lines 22a to 22d. The information for communication is stored in the memory 24 which is connected to the CPU 23. Meanwhile, the CPU 23 is connected to the dual port RAM 25 for communication with the host CPU 1 through the system bus 2, and exchanges information including the control command with the host CPU 1.

Each of the external image input/output devices 31 to 34 are connected to each of the image data lines 26a to 26d and to each of the switches 27a to 27d for switching connection between each of the devices 31 to 34 and the image bus 17, and transmits/receives image data. The CPU 23 switches the connection of the switches 27a to 27d based on the control command. The connection between each of the switches 27a to 27d are arranged so as to enable various combinations between the input/output devices. For example, in the figure, when the switch 27a is connected to the central node and all other switches are turned off, the image reader 31 and the laser printer 33 are combined so as to function as a digital copier. In addition, the memory control circuit 28 connected to the CPU 23 and to the system bus 2 sets and activates the count of the memory 24 when data is transmitted/received from the memory 24 to the output device and from the input device to the memory 24. The memory 24 is provided with a receiving buffer, a transmitting buffer and a communication table (a table of commands from the host CPU 1 and the input/output devices 31 to 34) and it stores various commands.

The CPU 23 carries out the control command communication, the control of the image line, transmission/reception of the information to and from the host CPU 1, the control of the memory control circuit 28, and so on described in the foregoing.

As described above, the image bus 17 on the side of the system body can be directly connected to the image data lines 26a to 26d of the external input/output devices. Meanwhile, the external input/output devices can be directly connected to each other, not through the image bus 17. Namely, in this system, each of the external devices can not only be connected to the image processing unit in one to one correspondence but also be connected directly with each other. For example, the image reader and the laser printer can be connected directly with each other so as to be used as a digital copier and the microscanner and the laser printer can be directly connected with each other so as to be used as a digital reader printer.

Figure 3:
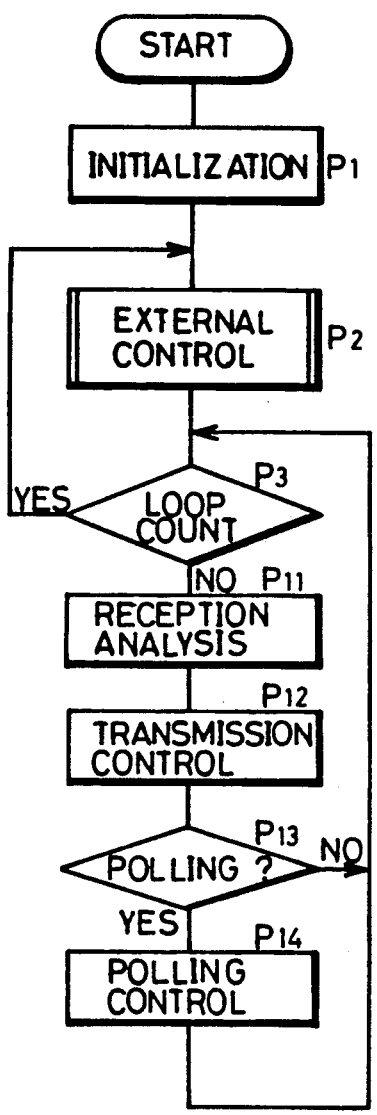
FIG. 3 shows a main flow of a CPU controlling an external device control unit in accordance with one embodiment of the present invention.

FIG. 3 shows the main flow of the CPU controlling the external device control unit 21 in accordance with one embodiment of the present invention.

When the power is turned on, the initializing of interruption, port, and serial communication in the CPU 23, initializing of peripheral circuits and communication permission for the peripheral circuits are carried out as initialization (step P1).

Thereafter, the subroutine of external control is processed in the step P2. Whether the activating command is given or not is determined in this subroutine. As will be described in detail later, if there is an activating command, the status of the external devices required for activation is checked, and the image line connection is controlled, the parameter is set for the external devices, and so on, and thereafter, the activating command is written in the transmitting buffer (step P2). The loop count for periodical status communication with the external devices is effected. The loop counter counts up at every loop of the main routine and outputs a carry signal when the count reaches a prescribed number. When it is determined that the count reaches a prescribed number of times (step P3), it returns to the step P2. Namely, external control is carried out at every constant number of times.

Figure 4:
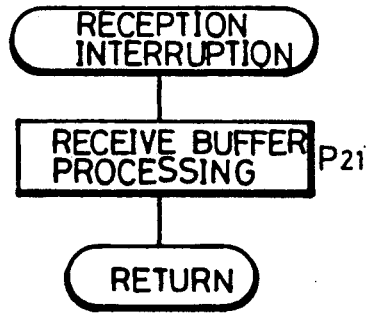
FIG. 4 shows a flow of a reception interrupting routine in association with the main flow of the CPU in accordance with one embodiment of the present invention.

Thereafter, the received data written in the receiving buffer of the memory 24 at the reception interrupting routine, which will be described later with reference to FIG. 4, is analyzed and the contents are written in the communication table of the memory 24 (step P11). The communication table of the memory 24 is scanned and it is determined whether there is any data to be transmitted. If there is any such data, it is written in the transmitting buffer of the memory 24 (step P12). Thereafter, whether a request command should be outputted or not is determined as a polling, which command requests status periodically from the external devices (step P13). If an answer to the request of the last time is returned, the request command is written in the transmitting buffer (step P14).

FIG. 4 is a reception interrupting routine which appropriately enters the main flow of FIG. 3.

When the reception interruption enters from the serial communication ports of the CPU 23, the data is written in the receiving buffer (step P21).

Figure 5:
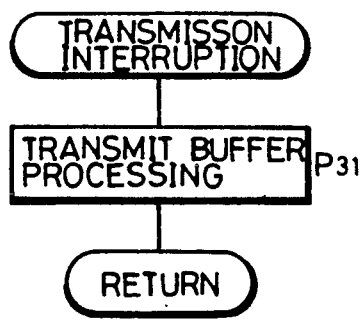
FIG. 5 shows a flow of a transmission interrupting routine in association with the main flow of the CPU in accordance with one embodiment of the present invention.

FIG. 5 is a transmission interrupting routine which appropriately enters the main routine of FIG. 3.

When the interruption of transmitting data empty enters the CPU 23, whether there is any data to be transmitted to the transmitting buffer or not is checked. If there is any such data, the data is outputted to the serial communication port. If there is no data, the transmission interruption is masked (step P31).

Figure 6:
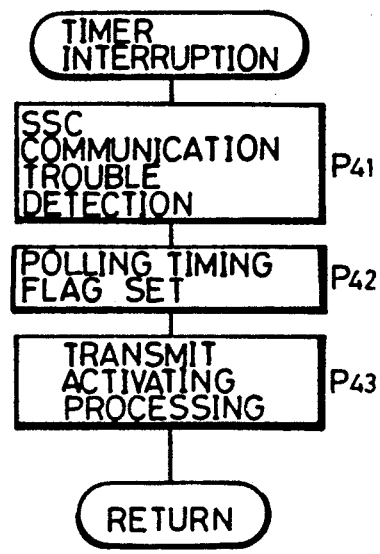
FIG. 6 shows a flow of a timer interrupting routine in association with the main flow of the CPU in accordance with one embodiment of the present invention.

FIG. 6 is a timer interrupting routine which appropriately enters the main routine of FIG. 3.

It is checked by the timer counter whether an answer to a request is returned in a prescribed time period after the transmission of the request command (step P41). If there is no answer returned, the polling timing flag is set for polling control determination (step P42). Then, the transmitting buffer is checked. If there is any data to be transmitted in the transmitting buffer, the data is outputted to the serial communication port and the transmission interruption is enabled (step P43).

Figure 7B:
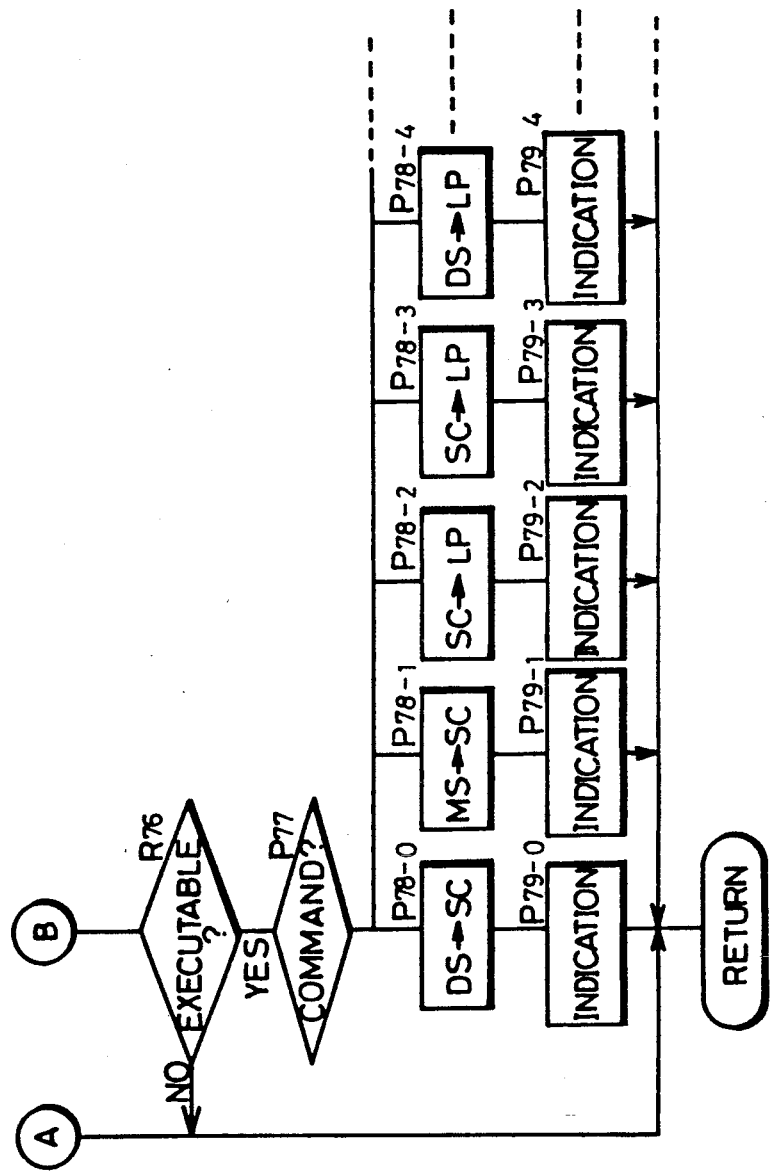

FIGS. 7A and 7B are the flow of the subroutine of the external control (step P2) shown in FIG. 3.

First, the print flag (various flags indicating that the image input/output sequence is being carried out) is checked (step P61). The flow branches to each of the process routines according to the contents (for example, being scanned, paper being fed) of the print flag (step P62), the respective processes are carried out (steps P63-0 to P63-n), and it proceeds to the step P71. However, if the print flag requires no processing (step P64), the indication showing that the input/output device is being used is released (step P65) and it returns to the main flow.

Thereafter, the data communication with the side of the body of the data processing device, reading of the dual port RAM 25, and writing of the commands and parameters to the communication table in the memory 24 are carried out (step P71).

Thereafter, the communication table of the memory 24 is scanned (step P72) and it is determined whether an activating command is inputted from the body of the image processing device or from the operating unit of the external image input device (step P73). If there is no activating command, this routine comes to an end. Meanwhile, if there are a plurality of activating commands (step P74), which command should be given priority is checked (step P75).

If it is determined that there is an executable activating command (step P76), the flow branches in accordance with the activating command (step P77), and carries out corresponding activating process (steps P78-0, P78-1, ... ). Thereafter, the instructions for indicating input/output devices which are in the activation ready state is carried out steps P79-0, P79-1, ... ).

Figure 8:
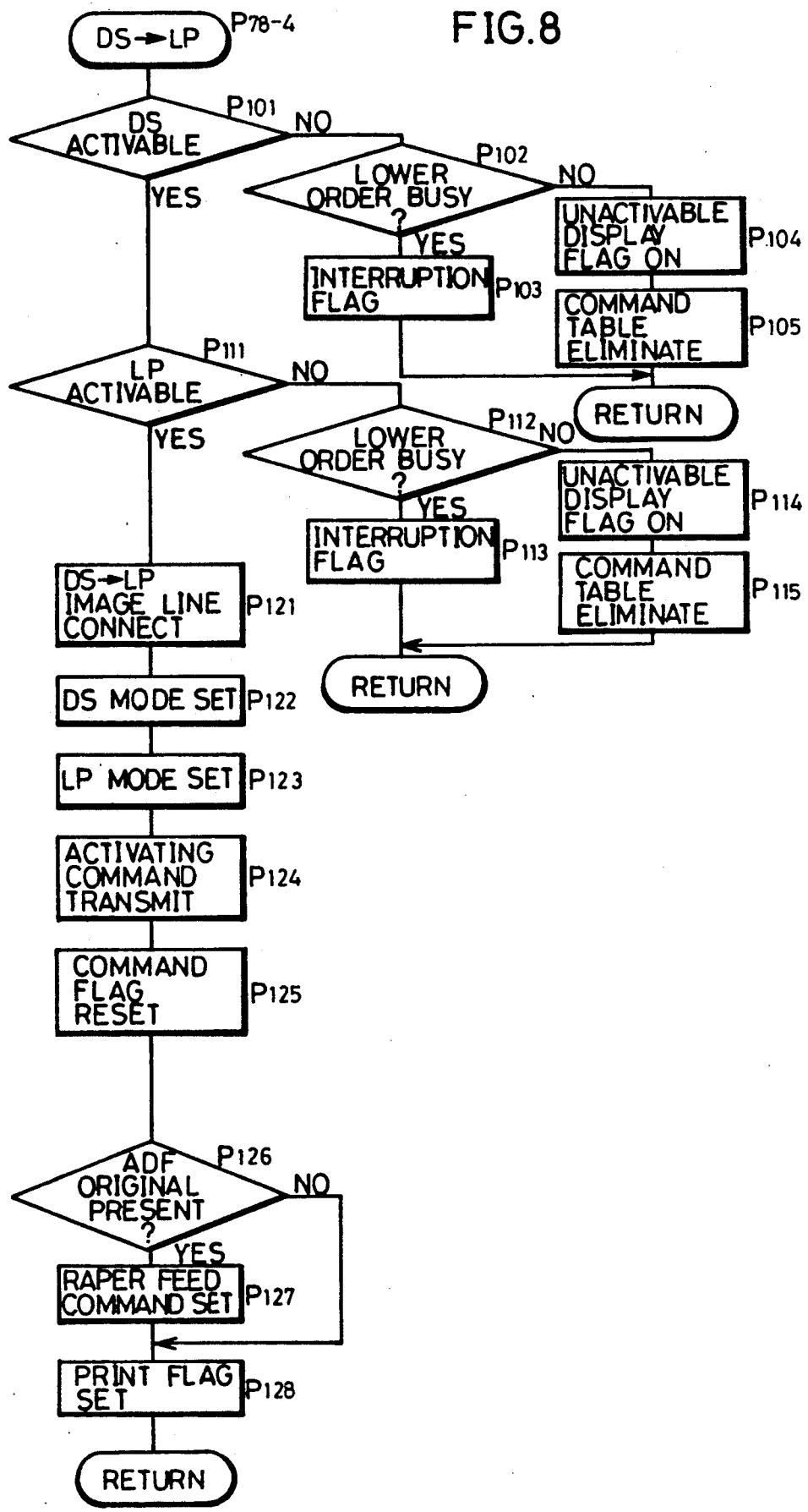
FIG. 8 is a flow showing the details of the steps in relation with the connection of an image reader with a laser printer in the routine of the external control in accordance with one embodiment of the present invention.

In the following, one example of individual activating process (steps P78-0, P78-1, ... ) will be described with reference to FIG. 8, in which the image reader (DS) and the laser printer (LP) are used (step P78-4). FIG. 8 shows the flow in association with the step P78-4 of FIG. 7B.

First, it is determined whether the image reader (DS) is activable or not (step P101). If it is unactivable, and if it is in operation being connected with other devices of lower priority (step P102), then an interruption flag is set (step P103) and it is activated in the next loop. If it is in operation being connected to other devices of higher priority or if it is not in operation (in case of trouble or when the power is not turned on), then it is determined to be unactivable and a flag for indicating that is set (step P104). This flag is processed in the step P79-4 of FIG. 7B. Thereafter, commands in association with the image reader are eliminated from the communication table so as to indicate on the communication table that the image reader 31 is unactivable.

When the image reader is activable, it is determined whether the laser printer (LP) can be used or not (step P111). If it is unactivable, and if it is in operation being connected to other devices of lower priority (step P112), then an interruption flag is set (step P113) and it is activated in the next loop. If it is in operation being connected to other devices of higher priority or if it is not in the activation ready state (in case of trouble or when the power is not turned on), then it is determined to be unactivable and a flag for indicating that the activation can not be carried out is set (step P114). Commands in association with the laser printer are eliminated from the communication table (step P115). It should be noted that either the image reader 31 or the laser printer 33 is incapable of being activated, the indication given in the step P79-4 will show that the activation can not be carried out.

When the image reader DS and the laser printer (LP) are both activable, then a signal is outputted for controlling the switches 27a to 27d for connecting the image line so as to connect the DS and LP (step P121).

Thereafter, controlling commands which are to be set in the DS mode such as magnification rate, paper size, exposure level, and so on are written in the transmitting buffer (step P122), and controlling commands which are to be set in the LP mode such as a paper size and the like are written in the transmitting buffer (step P123). Then, activating commands for activating the image reader 31 and the laser printer 33, respectively, are stored in the transmitting buffer of the memory 24 (step P124) and the processed command flag is reset (step P125). When there is an original in an original feeding device (ADF, not shown) which is attached to the image reader (DS) step P126), an original feed command is written in the transmitting buffer of the memory 24 so as to send the original feed command to the ADF (step P127). Thereafter, a paper feed flag as a print flag in the image input/output sequence is set (step P128) (the paper feeding flag is checked in the external control routine FIGS. 7A, 7B) and is controlled in sequence according thereto).

Thus, the activation and setting of the commands, flags and so on required when the image reader and the laser printer are used are completed.

Besides the combination of the above described image reader and the laser printer, the combination of the image reader and the laser filmer, the combination of the microscanner and the laser printer, and the combination of the microscanner and the laser printer can be similarly designated by the external input device. It goes without saying that these combinations can be selected by the command from the host CPU 1. In the present invention, the selection instruction from the host CPU as well as the selection instruction from the external input device are written in the communication table of the memory 24. Therefore, by retrieving the communication table the available combination of each of the input devices and of the output devices can be determined, whereby the host CPU need not always monitor and control the external input devices.

Meanwhile, in the steps P78-0 to P78-3 in FIG. 7B, SC indicates internal image processing device. For example, in the step P78-0, "DS→SC" means that the image read by the image reader is taken into the image processing device so as to be displayed on the CRT, to be processed, or to be stored in the memory. The combination of the internal image processing device and the external input/output devices is selected by the instruction from the host CPU.

As shown in the above described embodiment, according to the present invention, image input/output devices can be connected with each other from the external input device and the devices in association with the selected combination can be activated from the external input device. Consequently, the burden on the side of the image processing system can be reduced and an image processing system can be provided which is convenient for the user.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system having multiple input and output devices for processing image data and connecting input and output devices through a system bus and directly apart from the system bus, comprising:

an internal image processing section having an image processing unit and a display unit connected to each other through a system bus communicating control commands and through a data bus communicating image data, and a control unit for controlling said image processing unit and said display unit through said system bus and for generating a first command;

a plurality of external input devices which are to be electrically connected to said internal image processing section and capable of providing status signals, having an input portion for inputting a second command;

a plurality of external output devices which are to be electrically connected to said internal image processing section and capable of providing status signals;

external device connecting means which is electrically connected to the control unit and each of the external input and output devices, and comprising bus connecting means for electrically connecting an arbitrary pair of one of a following group of said data bus, one of said external input devices and one of said external output devices to each other, as a designated combination, and control means for controlling a connection by said bus connecting means based on the first command from said control unit or on the second command from said external input device, wherein said control means detects whether each of said external input and output devices are available or not by status signals from each of the external input and output devices, and invalidates a designation by said first or second command when one of said devices, in association with the designated combination, is incapable of being activated.

2. An image processing system according to claim 1, wherein an external input device comprises an image reader for reading an image on an original.

3. An image processing system according to claim 2, wherein an external output device comprises a printer for printing a dot image on a paper.

4. An image processing system according to claim 1, wherein an external input device comprises a microscanner for reading an image on a microfilm.

5. An image processing system according to claim 4, wherein an external output device comprises a printer for printing a dot image on a microfilm.

6. An image processing system according to claim 1, wherein said control means further includes a memory means for storing a table of available combinations of said external input devices and said external output devices that can be designated and means for designating a combination out of the combinations stored in said memory means based on said first or second command.

7. An image processing system according to claim 6, wherein said memory means includes a memory area for temporarily storing said first or second command.

8. An image processing system according to claim 7, wherein said control means determines whether said first or second command is stored in said memory area and exercises control when said first or second command is stored in said memory area.

9. An image processing system according to claim 1, wherein said control means further provides an indication of whether an input or an output device is unavailable.

10. An image processing system according to claim 1, wherein said control means controls, when an input or output device of the designated combination is in operation in accordance with a designation of any other command, the activation of said device based on a predetermined priority order.

11. An image processing system comprising:

an internal image processing section having an image processing unit and a display unit connected to each other through a system bus communicating a control command and through a data bus communicating image data, and a control unit for controlling said image processing unit and said display unit through said system bus;

a plurality of external input devices which are to be electrically connected to said internal image processing section;

a plurality of external output devices which are to be electrically connected to said internal image processing section;

an external device connecting section having a plurality of switching means for respectively connecting said data bus to said external input devices and said external output devices and, alternatively, directly connecting said external input devices and said external output devices together independent of said data bus to operate in the transmission of image data, directly, between an external input device and an external output device, and control means for controlling the connections by said respective switching means independently of one another, wherein said control unit generates a first signal to control said external device connecting section, at least one of said external input devices has means for inputting a second signal to control said external device connecting section, and said control means is electrically connected to said control unit, said external input devices and said external output devices and controls the connections by said switching means based on the first signal from said control unit or on the second signal from said one of said external input devices.

12. An image processing system according to claim 11, wherein said second signal designates one of said external output devices to be electrically connected to the external input device from which the second signal is inputted, and said control means enables said switching means to connect the external input device and the designated external output device when the second signal is inputted from the external input device.

13. An image processing system according to claim 11, wherein said control means controls, when a device in association with the designated combination is in operation in accordance with the designation of any other command, the activation of said device based on the priority order of said first or second signal.

14. An image processing system according to claim 11, wherein said control means includes a memory area for temporarily storing said first or second command.

15. An image processing system according to claim 11, wherein said control means determines whether said first or second command is stored in said memory area and exercises control, when said first or second command is stored in said memory area, based on the stored command.

16. An image processing system comprising:

image inputting means for inputting image data and having an input portion for inputting a connecting command;

an internal image processing section having image data processing means for processing the image data inputted by said image input means;

display means for displaying images based on the image data;

a data bus connecting said image data processing means and said display means for communicating the image data;

image outputting means for outputting the image data inputted by said image inputting means or the image data processed by said image data processing means;

connecting means for connecting said image inputting means to said data bus and, alternatively, connecting said image inputting means to said image outputting means directly independent of said data bus, and control means for controlling the connecting by said connecting means based on the connecting command from said image inputting means.

17. An image processing system comprising:

image inputting means for inputting image data and having an input portion for inputting a connecting command;

image data processing means for processing the image data inputted by said image input means;

a plurality of image outputting means for outputting one of the image data inputted by said image inputting means and the image data processed by said image data processing means, and a plurality of connecting means for selectively connecting said image inputting means to said image outputting means directly or to said image data processing means based on the connecting command from said image inputting means, wherein each of the connecting means can connect said image inputting means, said image processing means and a respective one of said image outputting means based on the connecting command.

18. An image processing system according to claim 17, wherein said connecting command comprises information designating one of said image outputting means which is to be connected to said image inputting means.

* * * * *